(12) United States Patent
Maille et al.

(10) Patent No.: US 7,437,684 B2
(45) Date of Patent: Oct. 14, 2008

(54) GRAPHICAL INTERFACE SYSTEM FOR MANIPULATING A VIRTUAL DUMMY

(75) Inventors: Bruno Maille, Paris (FR); Edouard Ramstein, Melun (FR); Patrick Chedmail, La Chapelle sur Erdre (FR)

(73) Assignee: SNECMA, Paris (FR)

( * ) Notice: Subject to any disclaimer, the term of this patent is extended or adjusted under 35 U.S.C. 154(b) by 544 days.

(21) Appl. No.: 10/819,987

(22) Filed: Apr. 8, 2004

(65) Prior Publication Data

US 2004/0257338 A1 Dec. 23, 2004

(30) Foreign Application Priority Data

Apr. 9, 2003 (FR) .................................. 03 04377

(51) Int. Cl.
*G06F 3/048* (2006.01)
*G06F 7/60* (2006.01)
*G06T 13/00* (2006.01)
(52) U.S. Cl. ........................ 715/852; 703/2; 345/473; 345/474
(58) Field of Classification Search ................ 715/849, 715/859, 860, 861, 852, 856; 703/2; 345/473–474
See application file for complete search history.

(56) References Cited

U.S. PATENT DOCUMENTS

| | | | |
|---|---|---|---|
| 6,121,966 A * | 9/2000 | Teodosio et al. | ............. 715/838 |
| 6,141,019 A * | 10/2000 | Roseborough et al. | ....... 345/473 |
| 6,695,770 B1 * | 2/2004 | Choy et al. | ..................... 600/38 |
| 2003/0007000 A1 | 1/2003 | Carlson et al. | |
| 2003/0034980 A1 * | 2/2003 | Imagawa et al. | ............. 345/474 |
| 2003/0137516 A1 * | 7/2003 | Harvill et al. | ................ 345/473 |
| 2004/0257368 A1 * | 12/2004 | Anderson | .................... 345/473 |

OTHER PUBLICATIONS

"Jack" software suite as evidenced by Internet Archive Wayback Machine http://www.transom.com/Public/transomjack.html Mar. 4, 2000.*
"International Conference on Computer Graphics and Interactive Techniques—Animating Human Athletics", Hodgins et al., proceedings of 22nd annual conference on Computer Graphics and Interactive Techniques, SIGGRAPH '95, 1995.*

(Continued)

*Primary Examiner*—Kieu D Vu
*Assistant Examiner*—Andrew Tank
(74) *Attorney, Agent, or Firm*—Oblon, Spivak, McClelland, Maier & Neustadt, P.C.

(57) ABSTRACT

To make it easier to manipulate in direct action and to manage the degrees of freedom of a virtual dummy, the invention provides a graphical interface system enabling two windows to be displayed on a screen. The first window contains an overall representation of the dummy making it possible, using pointer means such as a mouse, for example, to select a member of the dummy directly on the screen. In response to such selection, the selected member appears in the second window on a larger scale together with symbols indicating all of the degrees of freedom available on the member in question. The operator can then act directly on the symbols of the degrees of freedom to block or unblock them or indeed to manipulate the dummy in direct action.

17 Claims, 3 Drawing Sheets

OTHER PUBLICATIONS

Zheng et al., "Interactive human motion acquisition from video sequences," Computer Graphics International, 2000. Proceedings, pp. 209-217, 2000.*

Oore et al., "Local Physical Models for Interactive Character Animation", Computer Graphics Forum, vol. 21, No. 3, Sep. 2002, pp. 337-346.*

Bruno Maille, et al., "Multi-Agent Approach and Emergence of a Virtual Human Behaviour in a VR Environment", IEEE 2002 International Conference on Systems, Man and Cybernetics, vol. 7 of 7, Oct. 6-9, 2002, pp. 119-124.

V. Riffard, et al., "Optimal Posture of a Human Operator and CAD in Robotics", Proceedings of the 1996 IEEE International Conference on Robotics and Automation, Apr. 1996, pp. 1199-1204.

* cited by examiner

GRAPHICAL INTERFACE SYSTEM FOR MANIPULATING A VIRTUAL DUMMY

FIELD OF THE INVENTION

The present invention relates to the field of simulating manual operations by means of a virtual dummy. The invention relates more particularly to parameterizing and manipulating the members of a virtual dummy during such simulation.

BACKGROUND OF THE INVENTION

In numerous industries, such as the aviation or aerospace industries, in order to minimize costs and reduce development times (prototyping, testing), it is common practice to make use of virtual representations of an article that is to be designed. Such modeling presents the advantage of penalizing work little (in terms of cost and time) in the event of any backtracking during design. Modeling the article in virtual reality also makes it possible to perform all kinds of simulations that are useful for validating the design thereof.

Nevertheless, modeling and simulation are not restricted to designing articles. They can also be used for simulating human actions in a defined environment in order to visualize the movements and the postures that a technician will need to perform in order to effect particular actions. This is useful for validating and optimizing accessibility to certain parts of a piece of equipment that require regular inspection and maintenance, such as parts in an airplane engine, for example. Thus, ease of access to various elements of a piece of equipment can be verified virtually as soon as the equipment has been modelled, with this being made possible by simulation using a virtual dummy.

Virtual dummies are already in use for this type of application, as with software such as the Catia (trademark) software from Dassault Systems. That software enables simulations to be performed using a virtual dummy which is animated by manipulating its members and by acting on the degrees of freedom associated with each member. In order to obtain realistic simulation from a virtual dummy, it is necessary to ensure that the movements of each member are performed in compliance with the degrees of freedom that are associated with the member in question. In addition, depending on the surroundings (obstacles, position of the dummy, proximity of hazards for the operator), the degrees of freedom can be further limited. It must then be possible to block/unblock members or certain degrees of freedom thereof in order to obtain a simulation that takes account of the surroundings.

In that solution, the operations of manipulating a member or blocking/deblocking degrees of freedom of the member take place degree by degree. In other words, for each degree of freedom, the degree is selected or edited by means of a number, and then a decision is taken either to block it or to manipulate it. Such a procedure is relatively lengthy and fiddly. It is restricted to a single degree of freedom at a time while manipulating actions directly. Furthermore, it is necessary to know the number of each degree of freedom for each joint, and that does not make it easy to control the parameterization of the dummy.

OBJECT AND SUMMARY OF THE INVENTION

The invention seeks to remedy the above-mentioned drawbacks and to provide a system which makes the operator's task easier while parameterizing and manipulating a dummy dynamically.

These objects are achieved by a graphical interface system for managing degrees of freedom of a virtual dummy in a dynamic environment, said dummy comprising jointed members with degrees of freedom, the system comprising: display means; pointer means for designating a point on the display means and for acting thereon; and processor means for causing the display means to display the dummy in a first window, said processor means responding to the pointer means to cause a second window to display a selected member of the dummy displayed in the first window, said selected member including symbols indicating the degrees of freedom of said selected member.

Thus, by means of the system of the invention, the operation of selecting a member and its degrees of freedom is performed directly on the screen using a graphical representation of the dummy. The operator no longer needs to remember or consult edit numbers in order to access a particular degree of freedom of the dummy.

In a first aspect of the invention, the processor means respond to the pointer means selecting the symbol of a degree of freedom in the second window, by blocking or unblocking the corresponding degree of freedom. Degrees of freedom are parameterized directly on the screen with the pointer means, thereby further simplifying the work of the operator. In addition, the symbols for the degrees of freedom that are blocked are displayed in one predetermined color, while the symbols for the degrees of freedom that are not blocked are displayed in another predetermined color.

Any member having at least one degree of freedom that is blocked is displayed in a predetermined color in the first window in order to distinguish members that have degrees of freedom that have been deactivated.

According to a characteristic of the invention, each symbol for a degree of freedom comprises first and second arrows, each arrow representing one direction of rotation for the degree of freedom. The processor means respond to the pointer means selecting an arrow corresponding to a direction of rotation for a degree of freedom, by blocking that degree of freedom, said arrow then being displayed in a predetermined color.

According to another aspect of the invention, which corresponds to manipulation mode, the processor means respond to the pointer means selecting an arrow in the second window corresponding to the direction in which a degree of freedom is to be manipulated by manipulating that degree of freedom of the dummy. In this mode, the arrow corresponding to the direction in which the degree of freedom is to be manipulated is displayed in a predetermined color depending on whether the degree of freedom has or has not been manipulated. When the degree of freedom has been manipulated in one direction or the other on the graphical interface, the corresponding degree of freedom on the virtual dummy in use is moved in the corresponding direction and at a determined speed.

Any member having at least one degree of freedom that has been manipulated is displayed in a predetermined color in the first window in order to distinguish members having degrees of freedom that have been manipulated.

According to yet another characteristic of the invention, the processor means respond to the pointer means, in the first window, to activate or deactivate a member and to display the active members in one predetermined color and the deactivated members in another predetermined color. This first window also serves to select which member is to be displayed in detail together with its degrees of freedom in the second window.

BRIEF DESCRIPTION OF THE DRAWINGS

Other characteristics and advantages of the invention appear from the following description of particular embodiments of the invention given as non-limiting examples, and described with reference to the accompanying drawings, in which.

DETAILED DESCRIPTION OF AN EMBODIMENT

Figure 1:
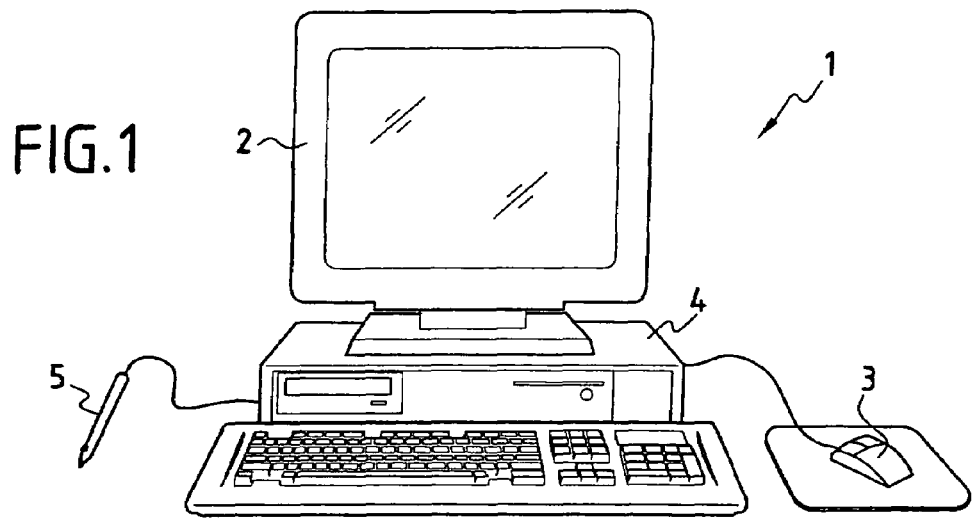
FIG. 1 is a perspective view of hardware means used in the interface system of the invention.

FIG. 1 shows the system of the present invention which comprises a processor appliance, such as a computer 1. The computer 1 can be used to execute a simulation or a similar program for displaying the positions and the movements of a dummy in virtual reality. For simplification purposes, the simulation program itself is not described in detail, since that program does not form part of the invention. The invention relates to the means for displaying, selecting, parameterizing, and manipulating the members of a virtual dummy, which means are suitable for being used in a virtual reality simulation program. In other words, the invention proposes a graphical interface which enables a user to manipulate or parameterize the members of a virtual dummy.

The computer 1 comprises hardware means of the kind usually associated with this type of appliance. More precisely, the computer 1 comprises a screen 2, means for aiming at a point on the screen and for acting on said point, such as a mouse 3, a light pen 5, or the like, and a processor unit 4 which controls the display on the screen 2, in particular in response to the actions performed with the mouse 3 or with some other equivalent means as described below.

Figure 2:
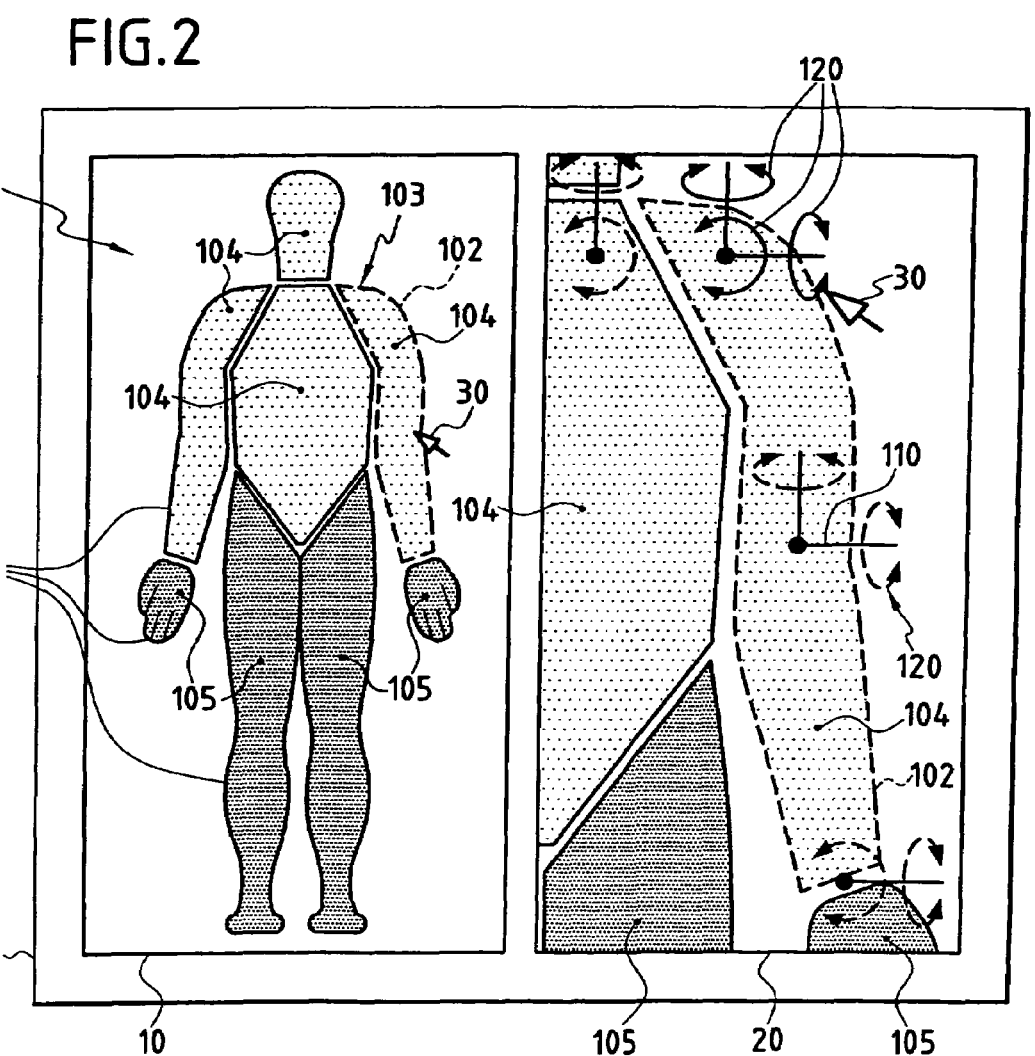
FIG. 2 shows a first example of the interface system of the invention in use.

FIG. 2 shows a first example of the system of the invention in use. This figure shows how the dummy is displayed on the screen 2 in accordance with the invention in order to enable a user to manipulate and parameterize the members of the dummy. For this purpose, the processor unit 4 begins by displaying a first window 10 in which a dummy 100 is shown in full. Each member that can be selected (in this example consideration is given to: head, chest, arms, hands, and legs) is defined by a closed outline 101 of a predetermined color, e.g. black. Thus, the display of the dummy in the first window 10 gives an overall view of the dummy, showing all of the members that can be selected.

From this first image, an operator can perform actions directly on the dummy shown in the window 10 by means of the mouse. The arrow 30 represents the mouse pointer that the operator moves over the dummy in order to designate a member that is to be selected. Once the arrow 30 is in position on the selected member, in this case the left arm 102, the operator selects the member by clicking on a button of the mouse, for example. In order to inform the operator which member has been selected, the color of the outline 101 thereof can be changed into a predetermined color 102 (dashed lines in the figures) in order to distinguish it from other members that have not been selected. When a member is selected, the operator can choose between two main operations: activating/deactivating the member as a whole, or selecting the member for parameterizing and/or manipulating certain degrees of freedom thereof. The first operation which consists in activating/deactivating the member is performed directly on the dummy shown in the window 10 by a corresponding command which can be programmed on a key of the computer keyboard or contained in a menu displayed on the screen (not shown) together with the dummy. Members that are activated are shown in one predetermined color 104 (pale shading in the figures), such as green for example, whereas members that are deactivated are shown in another color 105 (dark shading in the figures) such as red, for example. In the window 10 as shown in FIG. 2, the legs and the hands of the dummy are deactivated and therefore shown in red (dark shading in the figures), while the arms and the head are activated and are shown in green (pale shading in the figures).

When a member is selected, it is shown in detail in a second window 20 to enable the operator to perform the second above-mentioned operation in two modes: parameterization mode or manipulation mode applying to certain joints of the selected member. Each mode can be activated after the member has been selected by using a key on the keyboard or a menu displayed on the screen, for example.

FIG. 2 shows the operation in parameterization mode for parameterizing the degrees of freedom of a selected member. In the second window 20, the selected member 103, i.e. the left arm, is shown in an enlarged view to inform the operator about all of the degrees of freedom that are available on the joints of the selected member. For this purpose, the degrees of freedom of the member are represented in the form of axes 110 in the plane or perpendicular to the plane, and by double-headed arrows 120 representing pivoting about said axis in both directions. Thus, using the arrow 30 of the mouse, the operator points to the double-headed arrow of the degree of freedom that is to be parameterized and clicks on it to block (or unblock) the degree of freedom in question. If the operator clicks again on the double-headed arrow, that cancels the operation of blocking that degree of freedom. Thus, merely by pressing on the mouse button, the operator can block/unblock any degree of freedom of the selected member, and can do so directly on the graphical display of the member on the screen.

As for activating/deactivating members of the dummy as described above, color coding is used to distinguish on the screen display between degrees of freedom which are blocked and degrees of freedom which are not blocked. More precisely, when the operator blocks a degree of freedom, the corresponding double-headed arrow 120 becomes red (continuous lines in the figure).

In general, in parameterization mode for parameterizing the degrees of-freedom, the double-headed arrows are green by default (dashed lines in the figure), i.e. initially all degrees of freedom are unblocked.

Thus, for those degrees of freedom which are not originally blocked or which the operator has subsequently unblocked, the corresponding double-headed arrow 120 is green (dashed lines in the figure). By way of example, in FIG. 2, it can be seen that all of the degrees of freedom of the shoulder have been blocked and are in red (i.e. the three double-headed arrows 120 for the shoulder are in continuous lines).

By means of the two windows 10 and 20 which are displayed simultaneously on the screen, the operator has continuously available an overall view of the dummy (window 10) indicating which members are blocked/unblocked, and which member is selected, while also having a detailed view (window 20) of the selected member together with all of the degrees of freedom thereof that can be parameterized. When at least one degree of freedom is deactivated on a member, this is displayed in the window 10 by means of a predefined color enabling members having at least one deactivated degree of freedom to be identified.

Figure 3:
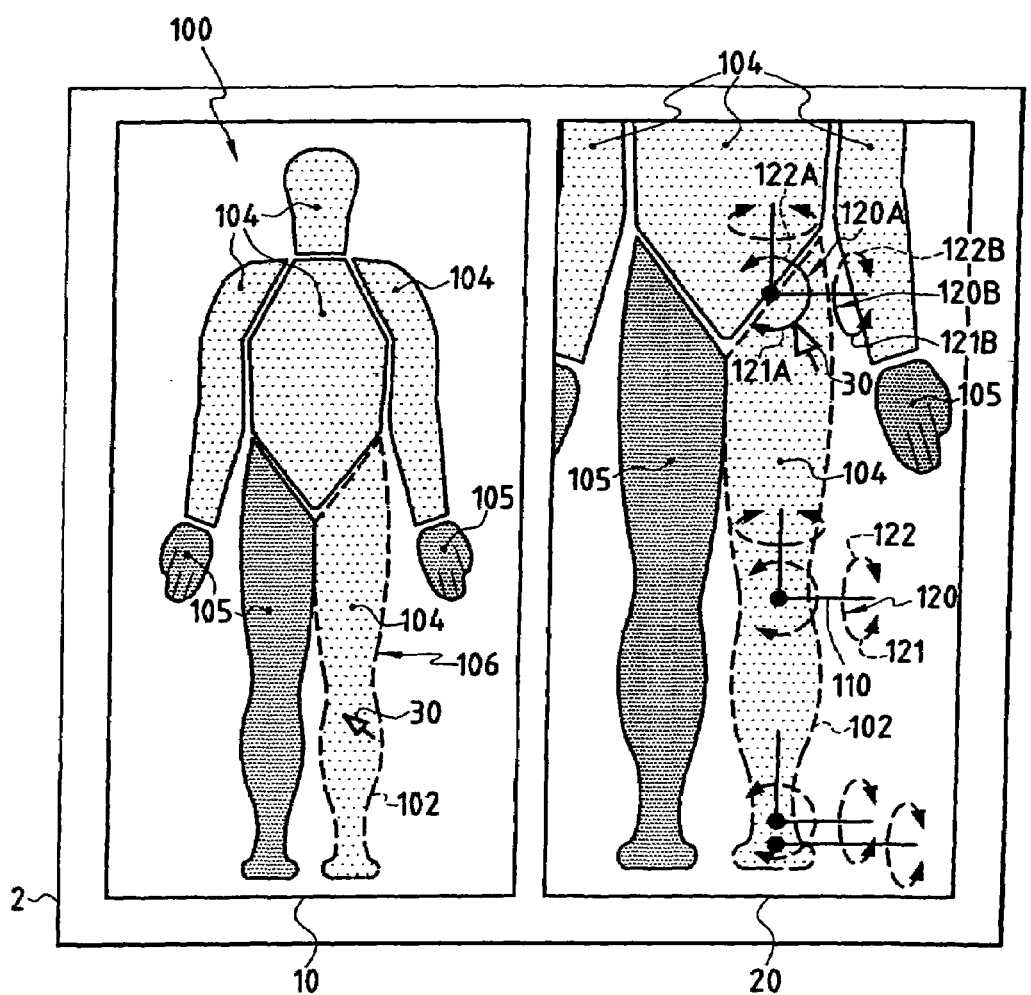
FIG. 3 shows a second example of the interface system of the invention in use.

FIG. 3 shows another implementation of the graphical interface of the invention for parameterizing the degrees of freedom of the left leg 106 of the dummy 100. In this example, the operator has thus selected the leg 106 so that an enlarged view thereof is displayed in the second window 20. As described with reference to FIG. 2, a degree of freedom is blocked or unblocked by clicking on the corresponding double-headed arrow 120 which, depending on its state (blocked or unblocked), is displayed in a predetermined color. Nevertheless, it is also possible to block a degree of freedom partially, i.e. to block one of the two directions of rotation thereof. Under such circumstances, and as shown in FIG. 3, the processor means are programmed to identify two portions 121 and 122 on each double-headed arrow 120 corresponding to respective directions of rotation of the degree of freedom in question. In FIG. 3, the operator clicks on portion 121A of arrow 120A. This has the effect of blocking the degree of freedom in the direction indicated by the portion 121A which is then displayed in red (continuous lines in the figure). The portion 122A which is not blocked remains green (dashed lines in the figure). In the figure, it can be seen, for example, that the degree of freedom represented by double-headed arrow 120B has also been blocked in part, the portion 121B being shown in red (continuous lines in the figure) whereas the portion 122B is in green (dashed lines in the figure).

The operations that can be performed on a selected member in manipulation mode are described below. In this mode, the display of the selected member in the window 20 is used for manipulating the degrees of freedom in direct action. Similarly, to block/unblock the above-described degrees of freedom in part, each double-headed arrow 120 has two portions 121 and 122, each corresponding to one direction of rotation for the degree of freedom. Thus, to manipulate one degree of freedom, the operator acts in the same manner as in the example described with reference to FIG. 3. The operator positions the mouse arrow 30 on the portion of the double-headed arrow which corresponds to the direction of rotation in which the operator seeks to manipulate the part of the member in question. By clicking on the selected portion of the double-headed arrow, the operator gives a movement setpoint to the dummy for this degree of freedom.

When at least one degree of freedom has been manipulated on a member, the member is displayed in the window 10 with a predefined color for distinguishing those members that include a manipulated degree of freedom.

In manipulation mode, the double-headed arrows are in red by default (continuous lines in the figure), i.e. initially all the degrees of freedom are not manipulated.

An example of manipulation in direct action is described below firstly with reference to FIG. 4 which shows the second window 20 of the graphics interface, and secondly with reference to FIGS. 5A, 5B, and 5C which are displays of a virtual dummy 200 to which displacement setpoints have been applied as generated using the graphical interface of FIG. 4. Movements on the virtual dummy in its simulated environment are displayed by a specific simulation program which has links with the graphical interface program of the invention. Thus, the data generated from the graphical interface is transmitted and used by the simulation program for animating the virtual dummy.

Figure 4:
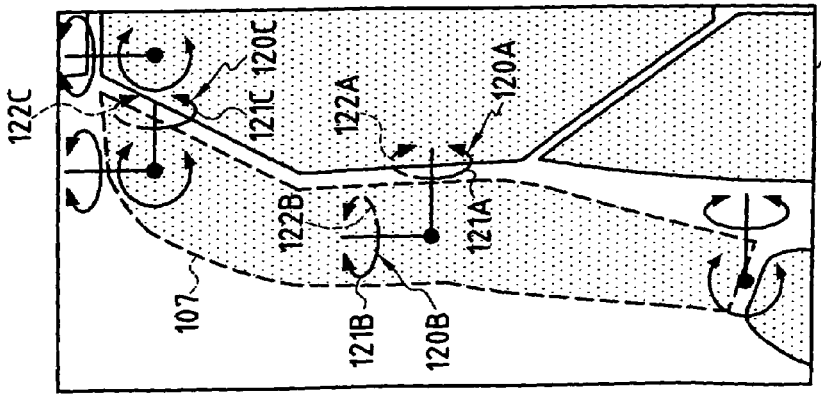
FIG. 4 shows a third example of the interface system of the invention in use.
Figure 5A:
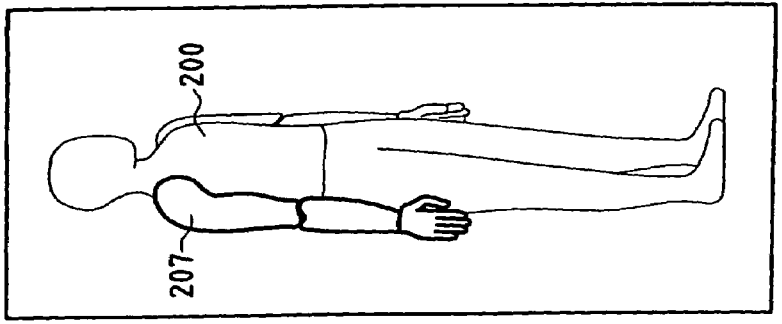
FIGS. 5A, 5B, and 5C show the display on a virtual dummy of the result of the actions performed in the third example of the interface system in use as shown in FIG. 4.
Figure 5B:
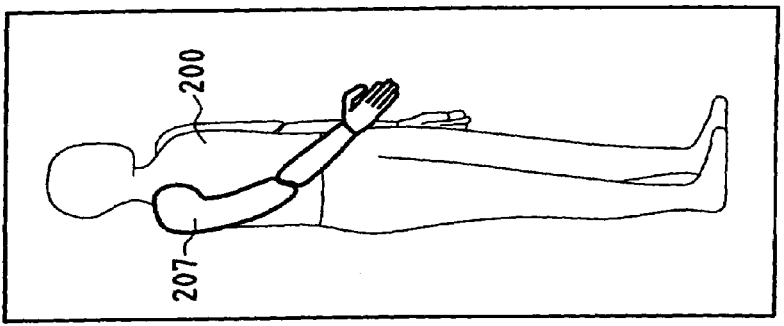
Figure 5C:
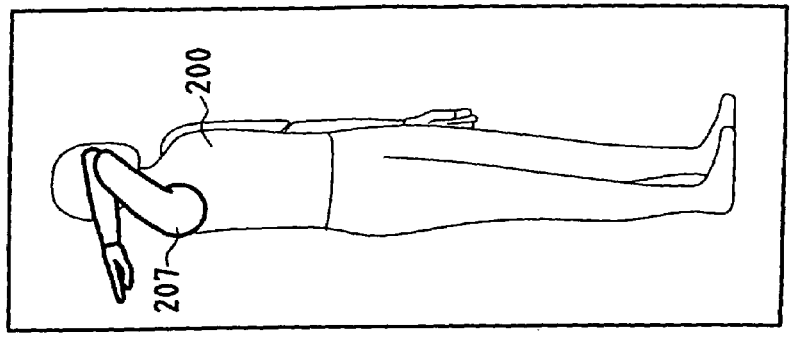

FIGS. 5A to 5C show a sequence of actions of a virtual dummy 200 as a function of movement setpoints applied using the graphical interface of FIG. 4. In this figure, the right arm 107 of the dummy is displayed in the window 20 and the displacement setpoints are applied by the operator successively selecting the portions 122A, 122B, and 122C of the double-headed arrows 120A, 120B, and 120C respectively. Selecting the portions 122A, 122B, and 122C corresponds respectively to the action of bending the arm, of rotating the forearm, and of rotating the shoulder in the corresponding direction and at a determined speed. Once these three degrees have been manipulated in the graphical interface, the dummy moves towards the position shown in FIG. 5C.

The movement setpoint given by the operator is also shown in the window 20 by changing the color of the selected portion of the double-headed arrow. In FIG. 4, the portions 122A, 122B, and 122C of the double-headed arrows 120A, 120B, and 120C on which the operator has clicked has become green (dashed lines in the figure).

FIG. 5B shows an intermediate position of the arm 207 of the virtual dummy 200 between the starting position (FIG. 5A) and the final position of the sequence of actions (FIG. 5C) when the movement setpoint is given to the elbow and shoulder joints by clicking on the portions 122A and 122C of the double-headed arrows 120A and 120C.

If the operator clicks again on the same portion of a double-headed arrow, the movement setpoint for the degree of freedom in question is canceled. The virtual dummy then maintains this degree of freedom in the position it was occupying at the time the movement setpoint was canceled and the corresponding portion of the double-headed arrow returns to red (continuous lines in the figure).

The invention thus proposes a graphical interface system which enables the operator to select and act on the degrees of freedom of the dummy directly on the screen by operations that are simple, such as clicking on a mouse, for example. The operator's working comfort is further improved by the two displayed windows which give the operator continuously and simultaneously an overall view of the dummy and a detailed view of the member on which the operator is working.

What is claimed is:

1. A graphical interface system for managing degrees of freedom of a virtual dummy in a dynamic environment, said dummy comprising jointed members with degrees of freedom, the system comprising:

means for displaying the dummy in a first window and in a second window;

means for designating a point on the means for displaying and for acting thereon;

means for causing the means for displaying to display the dummy in the first window; and means for responding to the means for designating to cause the second window to display a selected member of the dummy displayed in the first window, wherein said selected member includes symbols indicating the degrees of freedom of said selected member, wherein the means for responding affects a movement of the dummy with respect to the indicated degree of freedom in response to the means for designating selecting at least one of the symbols, and wherein the means for responding responds to the means for designating by blocking or unblocking the corresponding degree of freedom in response to the means for designating selecting the at least one of the symbols, such that when the corresponding degree of freedom of the selected member is changed from a blocked state to an unblocked state, the selected member moves with respect to the corresponding degree of freedom, and when the corresponding degree of freedom of the selected member is changed from the unblocked state to the blocked state, the movement of the selected member with respect to the corresponding degree of freedom stops.

2. A system according to claim 1, wherein the member(s) having at least one degree of freedom that is blocked is/are displayed in a predetermined color in the first window.

3. A system according to claim 1, wherein the symbols for blocked degrees of freedom are displayed in one predetermined color and the symbols for degrees of freedom that are unblocked are displayed in another predetermined color.

4. A system according to claim 1, wherein each symbol for a degree of freedom comprises first and second arrows, each arrow representing one direction of rotation for the degree of freedom.

5. A system according to claim 4, wherein the means for responding responds to the means for designating selecting an arrow corresponding to a direction of rotation for a degree of freedom by blocking that degree of freedom, said arrow then being displayed in a predetermined color.

6. A system according to claim 4, wherein the means for responding responds to the means for designating selecting an arrow in the second window corresponding to a direction in which a degree of freedom is manipulated by manipulating that degree of freedom of the dummy.

7. A system according to claim 6, wherein the member(s) having at least one degree of freedom that has been manipulated is/are displayed in a predetermined color in the first window.

8. A system according to claim 6, wherein, in the second window, the arrow corresponding to the direction of manipulation of the degree of freedom is displayed in a predetermined color.

9. A system according to claim 1, wherein the means for responding responds to the means for designating selecting a member, in the first window, by activating or deactivating that member and by displaying the activated members in one predetermined color and the deactivated members in another predetermined color.

10. A system according to claim 1, wherein the means for displaying displays the outline of the selected member in a predetermined color.

11. The system according to claim 1, wherein the dynamic environment includes a machine and the virtual dummy corresponds to an individual accessing the machine.

12. The system according to claim 11, wherein the machine is an airplane engine.

13. A graphical interface system for managing degrees of freedom of a virtual dummy in a dynamic environment, the dummy including jointed members with degrees of freedom, comprising:
a display unit configured to display the dummy in a first window and in a second window;
a pointer unit configured to designate a point on the display unit and configured to act thereon;
a processor unit configured to cause the display unit to display the dummy in the first window and configured to respond to the pointer unit to cause the second window to display a selected member of the dummy displayed in the first window;
a plurality of symbols displayed in the second window, each of the symbols indicating a degree of freedom of the selected member of the dummy, wherein
when one of the symbols is selected by the pointer, the corresponding degree of freedom of the selected member is either changed from a blocked state to an unblocked state or changed from the unblocked state to the blocked state,
when the corresponding degree of freedom of the selected member is in the blocked state, the selected member cannot be moved with respect to the corresponding degree of freedom,
when the corresponding degree of freedom of the selected member is changed from the blocked state to the unblocked state, the selected member moves with respect to the corresponding degree of freedom, and
when the corresponding degree of freedom of the selected member is changed from the unblocked state to the blocked state, the movement of the selected member with respect to the corresponding degree of freedom stops.

14. The system according to claim 13, wherein
each of the symbols includes first and second arrows,
the first and the second arrow each represent one direction of rotation for the degree of freedom, and
when one of the arrows is selected by the pointer, a corresponding direction of rotation for the degree of freedom of the selected member is either changed from the blocked state to the unblocked state or changed from the unblocked state to the blocked state.

15. The system according to claim 13, wherein
the symbols are displayed in the second window, and
the symbols are not displayed in the first window.

16. The system according to claim 13, wherein the dynamic environment includes a machine and the virtual dummy corresponds to an individual accessing the machine.

17. The system according to claim 16, wherein the machine is an airplane engine.

* * * * *